United States Patent
Carbune et al.

(10) Patent No.: US 12,400,641 B2
(45) Date of Patent: Aug. 26, 2025

(54) CONDITION DEPENDENT SCALABLE UTILITIES FOR AN AUTOMATED ASSISTANT

(71) Applicant: GOOGLE LLC, Mountain View, CA (US)

(72) Inventors: Victor Carbune, Zurich (CH); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 240 days.

(21) Appl. No.: 17/884,141

(22) Filed: Aug. 9, 2022

(65) Prior Publication Data
US 2024/0054994 A1    Feb. 15, 2024

(51) Int. Cl.
| G10L 15/22 | (2006.01) |
| G06F 3/16 | (2006.01) |
| G06F 16/2457 | (2019.01) |
| G10L 15/18 | (2013.01) |

(52) U.S. Cl.
CPC .......... *G10L 15/1815* (2013.01); *G06F 3/167* (2013.01); *G06F 16/2457* (2019.01); *G10L 15/22* (2013.01); *G10L 2015/223* (2013.01)

(58) Field of Classification Search
CPC ................ G10L 15/1815; G10L 15/22; G10L 2015/223; G06F 3/167; G06F 16/2457; G06F 40/35; G06F 40/30; H04L 51/02; G06N 3/008; G06N 20/00
See application file for complete search history.

(56) References Cited

U.S. PATENT DOCUMENTS

| 10,453,117 | B1 * | 10/2019 | Reavely ................ G06N 5/027 |
| 10,990,377 | B2 | 4/2021 | Gelfenbeyn et al. |
| 11,087,023 | B2 * | 8/2021 | Feuz ................... G10L 15/1815 |
| 2014/0249830 | A1 * | 9/2014 | Gallopyn ................ G16Z 99/00 |
| | | | 705/2 |

(Continued)

FOREIGN PATENT DOCUMENTS

EP    3939033 A1    1/2022

OTHER PUBLICATIONS

European Patent Office; International Search Report and Written Opinion issued in Application No. PCT/US2022/051041; 16 pages; dated May 3, 2023.

*Primary Examiner* — Paras D Shah
*Assistant Examiner* — Mulugeta Tuji Dugda
(74) *Attorney, Agent, or Firm* — Gray Ice Higdon

(57) ABSTRACT

Implementations set forth herein relate to an automated assistant that can employ various utilities according to whether certain conditions are satisfied for a given utility and/or whether a particular input is determined to have a threshold degree of relevance to the given utility. The automated assistant can be customized by a third party entity, which can make the automated assistant available via a device and/or application. The automated assistant can operate according to certain utilities that have been permitted by the third party entity. However, the third party entity can allow the automated assistant to employ other scalable utilities when a user input is determined to have a threshold degree of relevance and/or when usage of certain scalable utilities has not exceeded a threshold. The utility can refer to a machine learning model and/or other data that can be employed to resolve an input.

19 Claims, 9 Drawing Sheets

(56) References Cited

U.S. PATENT DOCUMENTS

| | | | | |
|---|---|---|---|---|
| 2018/0336050 A1* | 11/2018 | Mukherjee | ............... | G06F 3/167 |
| 2020/0402507 A1* | 12/2020 | Neelakantan | ........... | G06N 3/045 |
| 2022/0360909 A1* | 11/2022 | Reed | ....................... | H04R 25/30 |

* cited by examiner

CONDITION DEPENDENT SCALABLE UTILITIES FOR AN AUTOMATED ASSISTANT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

In many instances, automated assistants are employed through application programming interfaces (APIs) to other applications, thereby allowing certain features of an automated assistant to be accessible via another application. For example, an entity that provides a third party application for troubleshooting appliances may utilize an assistant API to facilitate assistant interactions with users who are accessing the third party application. However, as a result of facilitating such interactions, users may address an automated assistant via the third party application to receive assistance regarding a range of matters that are outside of the scope of the third party application. For example, the user may ask the automated assistant to read aloud a manual for a particular appliance, and then solicit the automated assistant for directions to a nearby appliance store. However, when the third party entity has not enlisted certain services of the automated assistant for providing directions, the automated assistant may respond with an error indication or non-substantive output. The user experience for such third party applications may be diminished as a result and, moreover, the entity providing the third party application may not be aware of how often these error indications are being rendered.

SUMMARY

Implementations set forth herein relate to an automated assistant that can provide services (i.e., utilities) according to scaling criteria, when such scaling criteria is satisfied. In this way, third party entities that seek to incorporate assistant functionality in their respective devices and/or applications can do so according to limitations that can preserve resources of those third party entities. For example, a third party entity that has a public storefront may provide the public with access to a third party device when entering the public storefront. The third party device (e.g., third party relative to a party that provides the automated assistant) can provide access to the automated assistant according to whether the third party entity has authorized certain utilities of the automated assistant. For example, the public storefront can be a pet store and the third party entity can authorize an animal health service, which can allow the automated assistant to answer health questions regarding a certain animal. The third party entity can also authorize an animal products service, which can allow the automated assistant to order animal products for a user. In some implementations, the third party entity can elect to allow the automated assistant to answer user queries that may involve one or more other utilities that may not be expressly enlisted by the third party entity. However, these one or more other utilities may only be utilized according to a specified budget and/or other threshold of the third party entity. Alternatively, or additionally, these one or more other utilities may only be utilized according to a semantic similarity between content of a user input and utilities that the third party entity has already enlisted. Alternatively, or additionally, these one or more other utilities may only be utilized according to a semantic similarity between content of user input and other data that may be associated with the third party entity.

For example, when a user enters the storefront, the user can provide a spoken utterance to an automated assistant via the third party device. The spoken utterance can be, for example, "Assistant, tell me the best dogfood for a Great Pyrenees." Because the third party entity expressly authorizes the animal health utility (i.e., a plugin, a service, a module, and/or other feature for an application) for their automated assistant, the automated assistant can generate a response (e.g., "A grain-free dogfood may be best for Great Pyrenees.") utilizing the animal health utility. Thereafter, another user can provide the automated assistant with another spoken utterance such as, for example, "Assistant, where is the nearest dog park?" The automated assistant can determine that the utilities currently enlisted by the third party entity may not be suitable for generating a response to this other spoken utterance. In some implementations, the automated assistant can determine whether the other spoken utterance is semantically similar to a utility that is authorized by the third party entity. Semantic similarity can be determined using one or more heuristic processes and/or one or more trained machine learning models.

In some implementations, the third party entity can select a preference for the automated assistant to enlist an appropriate utility for responding to certain user inputs that are within a threshold degree of similarity to one or more utilities already enlisted by the third party entity. Alternatively, or additionally, the third party entity can select another preference for the automated assistant to authorize an appropriate utility for responding to certain user inputs when the appropriate utility can be utilized without exceeding a budget or other threshold specified by the third party entity. In this way, the utility of an automated assistant that is customized by a third party can scale according to feedback generated from interactions between users and the customized automated assistant. This can allow any customized automated assistant to adaptively fulfill user queries. This can be especially beneficial in contexts in which a developer of the customized automated assistant may not have anticipated that users would provide queries related to assistant utilities that were not initially authorized by the developer.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
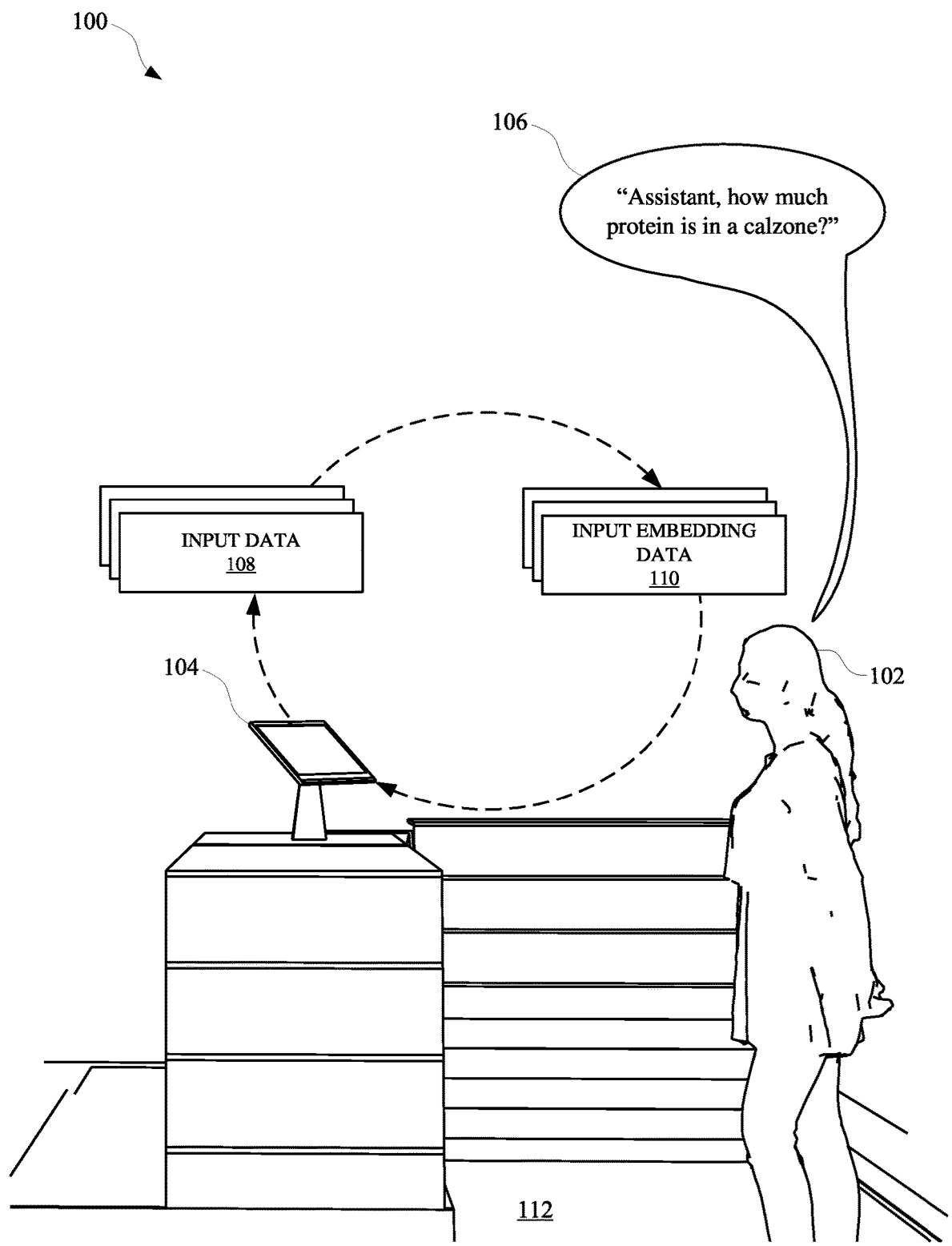
FIG. 1A, FIG. 1B, and FIG. 1C illustrate view of a user interacting with an automated assistant that employs scalable utilities according to whether certain conditions are satisfied for one or more user queries.
Figure 1B:
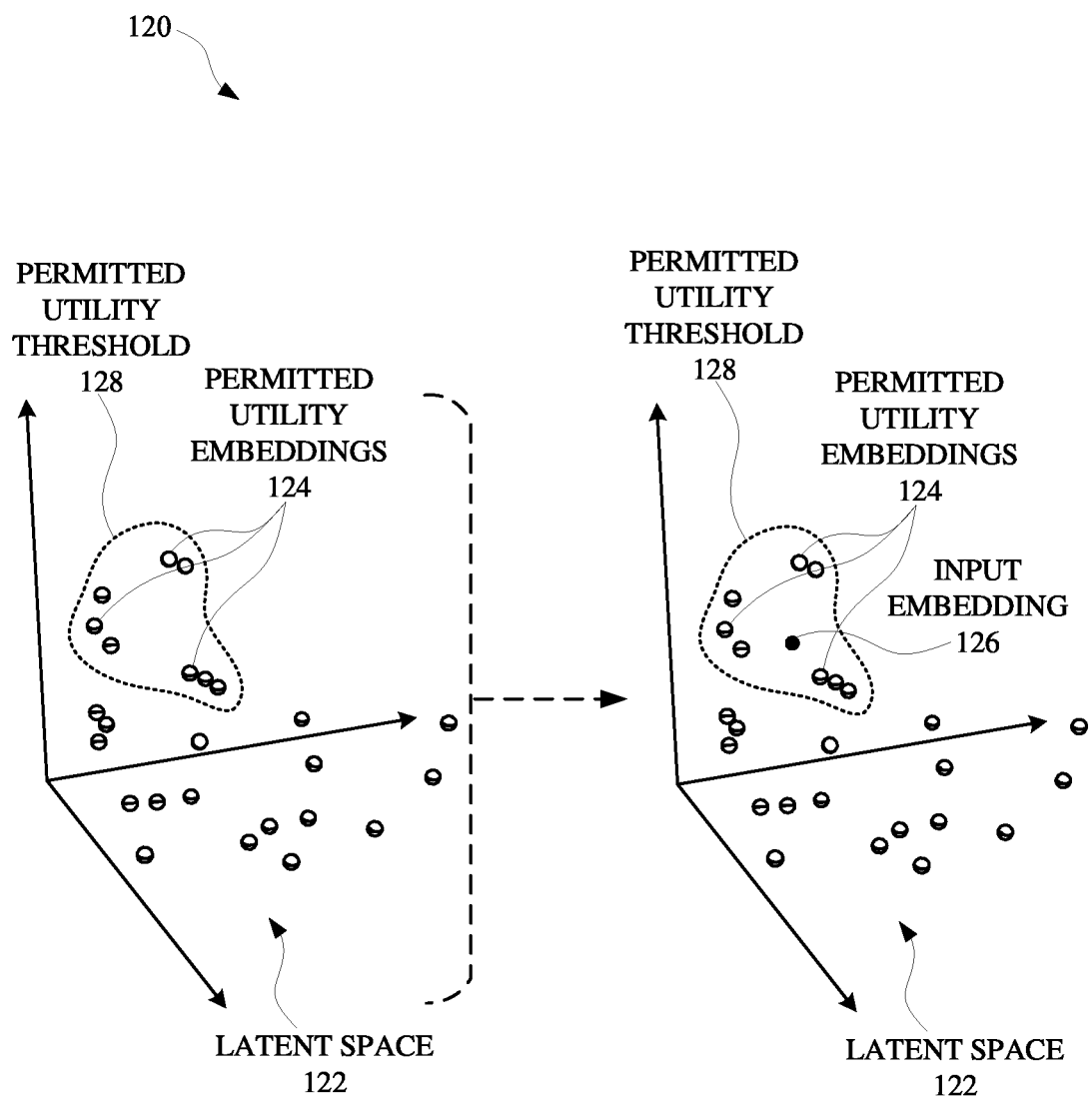
Figure 1C:
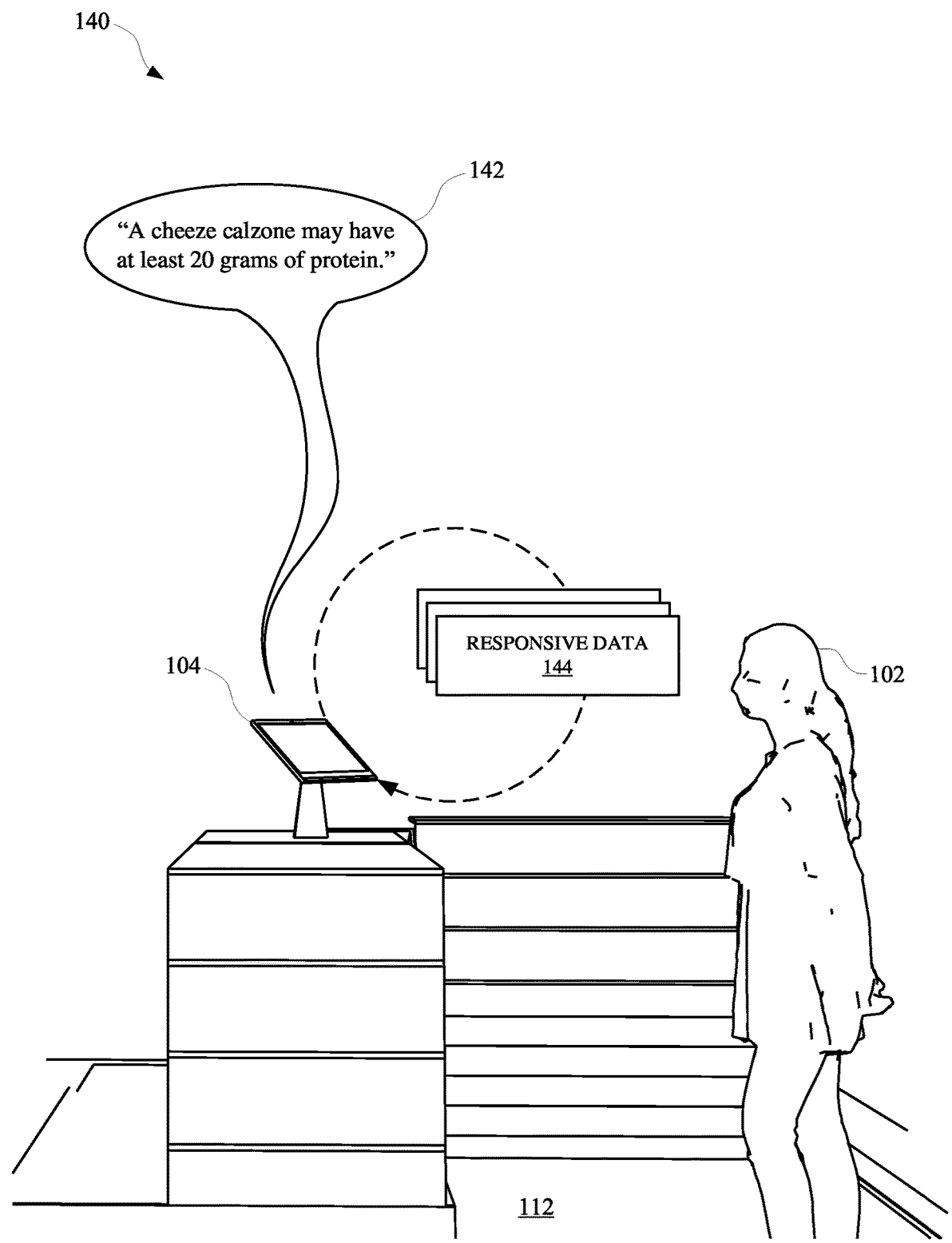

FIG. 1A, FIG. 1B, and FIG. 1C illustrate a view 100, a view 120, and a view 140 of user 102 interacting with an automated assistant that employs scalable utilities according to whether certain conditions are satisfied for one or more user queries. The automated assistant can be provided by an entity, which can allow third party entities to subscribe to certain automated assistant utilities for customizing an instance of the automated assistant. An automated assistant that is customized by the third party entity can be incorporated into services, devices, and/or other interfaces made available by the third party entity. However, the third party entity can limit a scope of tasks handled by the automated assistant and/or limit an amount of resources consumed by their instance of the automated assistant.

For example, a user 102 can enter a location 112 associated with a third party entity, and the location 112 can be a shop with a computing device 104 for assisting customers that enter the location 112. In some implementations, the third party entity (e.g., a deli) can employ the automated assistant with one or more utilities and/or services that allow the automated assistant to resolve certain user queries within a particular scope and/or subject matter. For example, the computing device 104 can provide access to an automated assistant that can employ one or more utilities for resolving health and food-related queries. In this way, when the user 102 enters the location 112 and has a question about certain products, the automated assistant can readily provide information without having to wait for another agent of the third party entity to finish assisting another customer.

As an example, the user 102 can provide a spoken utterance 106 such as, "Assistant, how much protein is in a calzone?", and the spoken utterance 106 can be received by the automated assistant via an audio interface (e.g., a microphone) of the computing device 104. In some implementations, input data 108 generated in response to receiving the spoken utterance 106 can be processed to determine whether the spoken utterance 106 is relevant to a utility of the automated assistant. A relevance of the spoken utterance 106 to a utility can be determined using one or more heuristic processes and/or one or more trained machine learning models. For example, the input data 108 characterizing the spoken utterance 106 can be processed using one or more trained machine learning models to generate input embedding data 110 that can be mapped to a latent space. An input embedding characterized by the input embedding data 110 can then be mapped to a latent space 122 with utility embeddings, which can correspond to permitted utility embeddings 124 that can be employed by the automated assistant.

For example, and as illustrated in FIG. 1B, a latent space 122 can include a variety of different embeddings that can correspond to permitted utilities and scalable utilities. In some implementations, an input embedding 126 can be mapped to the latent space 122 for determining whether a distance in the latent space 122 between the input embedding 126 and one or more permitted utility embeddings 124 satisfies a permitted utility threshold 128. In some implementations, the permitted utility threshold 128 can be a value and/or a vector that can define an area in which input embeddings can be compared. When the input embedding 126 is determined to have a distance that is within the permitted utility threshold 128, the input from the user 102 can be resolved according to a permitted utility of the automated assistant. Otherwise, when the distance does not satisfy the permitted utility threshold 128, a determination can be made regarding whether conditions for employing a scalable utility are satisfied.

When the input embedding 126 is determined to be within the threshold distance from one or more of the permitted utility embeddings, one or more of the permitted utilities can be utilized to resolve the spoken utterance 106 from the user 102. For example, one or more permitted utilities for resolving health and food-related queries can be utilized to generate responsive data 144 from the spoken utterance 106. The responsive data 144 can characterize an output 142 such as, "A cheese calzone may have at least 20 grams of protein." However, when an input is determined to not be relevant enough to be resolved by a permitted utility, one or more conditions can be determined for utilizing a scalable utility. In some implementations, selecting a particular utility for generating responsive data can be performed using a hierarchical process, optionally in combination with one or more other processes (e.g., using a heuristic process, one or more machine learning models, etc.). For example, there can be multiple categories of user queries, and each respective category of user queries can be associated with a particular set of utilities that can be utilized to resolve queries for a respective category. When a user query is determined to correspond to a particular category of utilities (e.g., based on a heuristic process and/or machine learning model), a threshold-based method can be utilized to select a particular utility that is within the set of utilities for that particular category. In other words, a non-threshold based method can be utilized to determine a suitable category for a user query, and a threshold based method can be utilized to select a particular utility for resolving the user query.

Figure 2A:
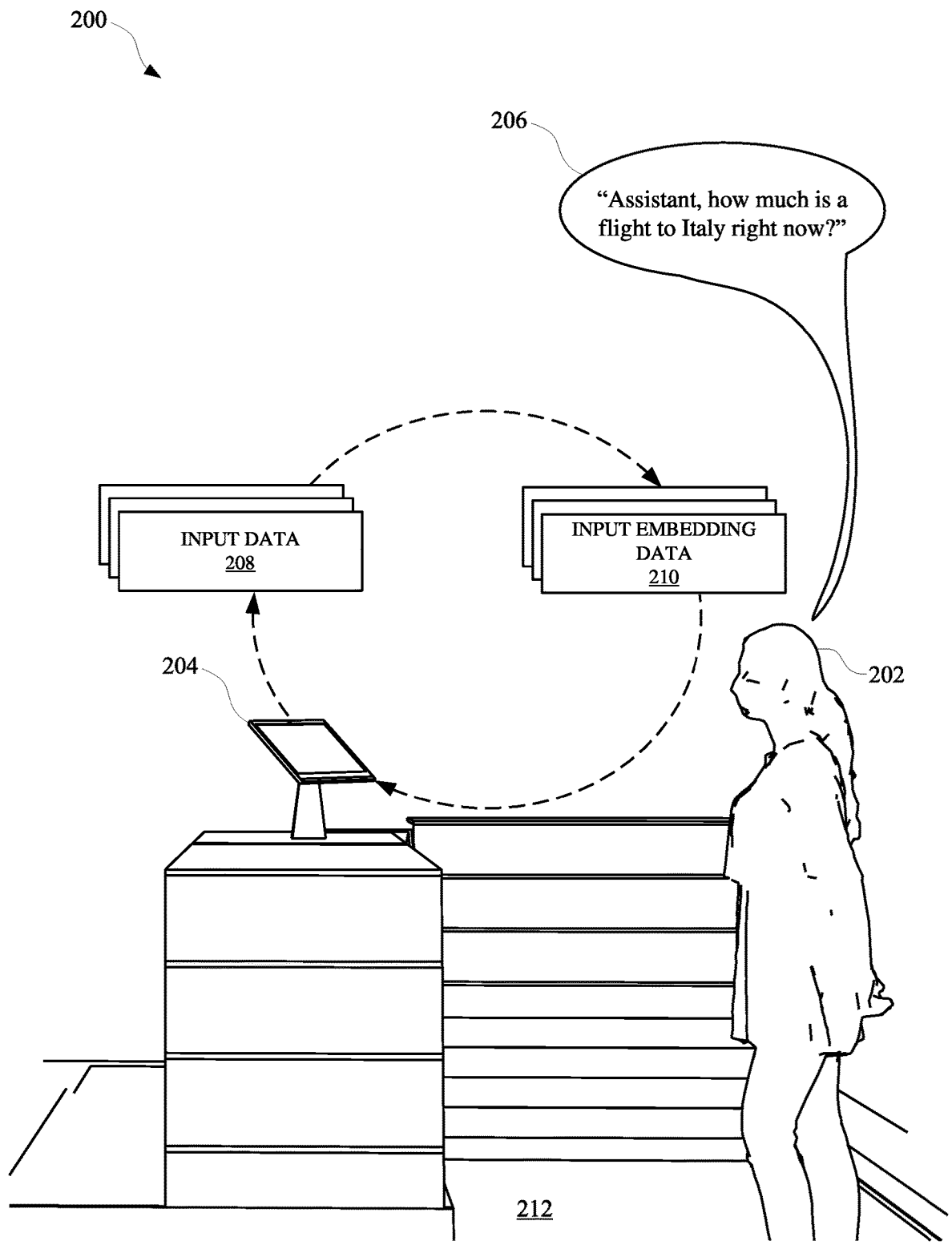
FIG. 2A, FIG. 2B, and FIG. 2C illustrate views of a user invoking an automated assistant that can resolve an input from the user with a scalable utility, when one or more conditions are determined to be satisfied.
Figure 2B:
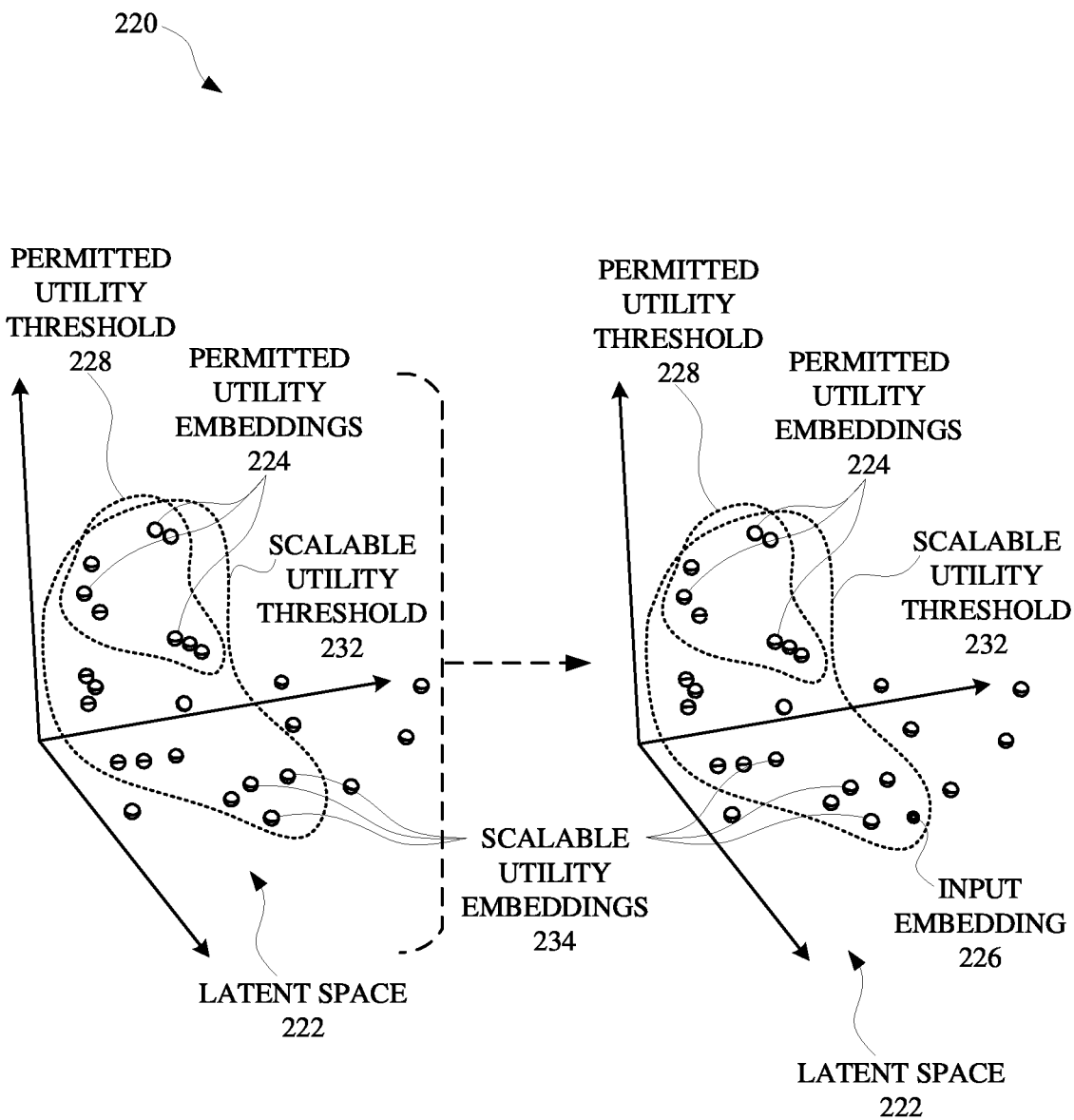
Figure 2C:
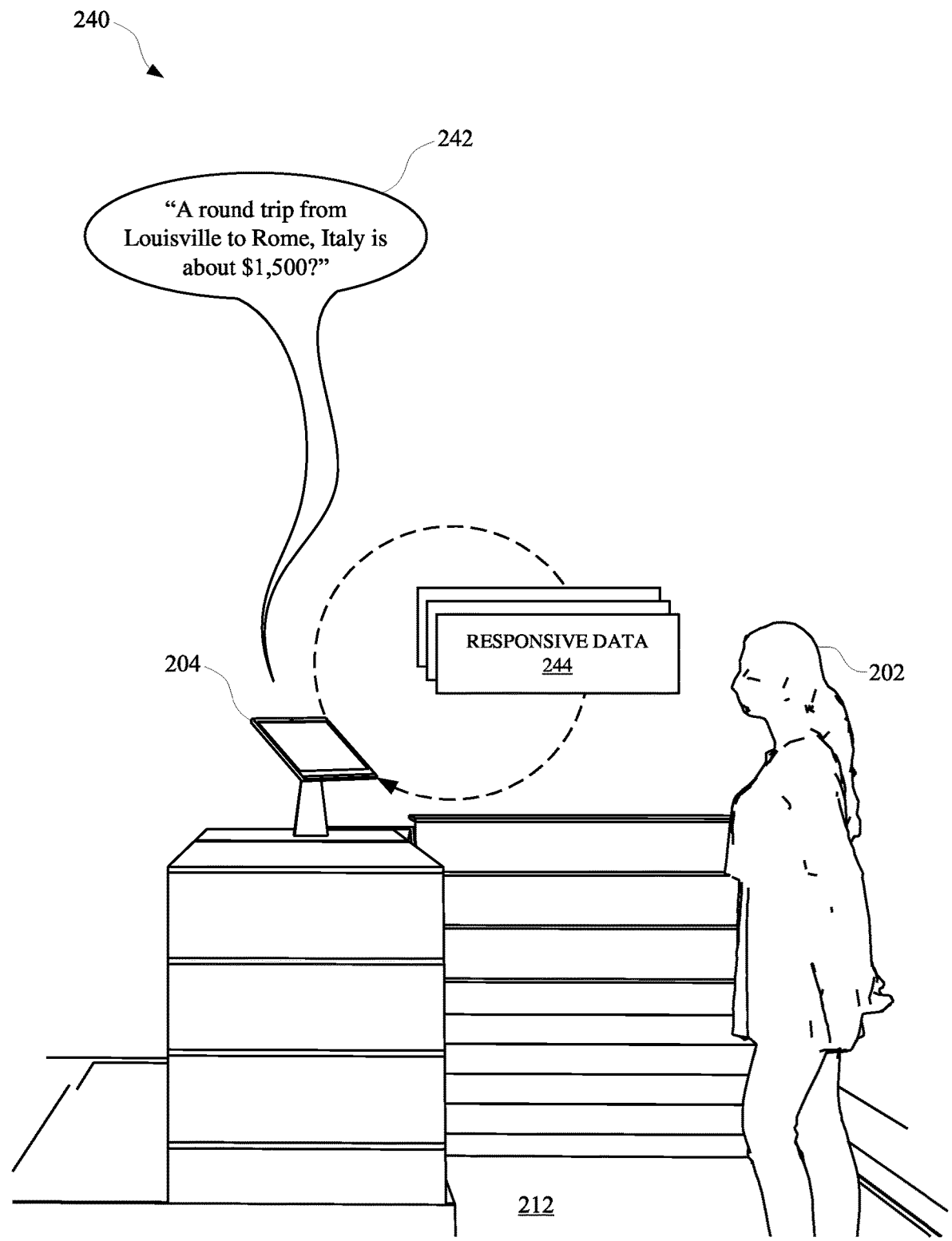

FIG. 2A, FIG. 2B, and FIG. 2C illustrate a view 200 of a user 202 invoking an automated assistant that can resolve an input from the user 202 with a scalable utility, when one or more conditions are determined to be satisfied. The automated assistant can be employed by a third party entity (e.g., third party relative to a first party that provides functionality of the automated assistant) that can select certain utilities for the automated assistant to utilize. In some implementations, each utility may be selected according to a budget of the third party entity, and/or a breadth of input subject matter that the third party entity would like the automated assistant to handle. Alternatively, or additionally, the third party entity can select whether the automated assistant can employ other utilities for resolving other inputs that certain permitted utilities may not be able to resolve. In some implementations, the third party entity can select whether these other inputs will be resolved according to a budget of the third party entity, a relevance of each input to one or more permitted utilities, and/or any other condition for employing a service.

For example, the user 202 can provide a spoken utterance 206 to a computing device 204 that provides access to the automated assistant of a third party entity. The third party entity can be, for example, a deli with a storefront at a location 212 that users can walk to. The spoken utterance 206 can include a query to be resolved, such as, "Assistant, how much is a flight to Italy right now?" In response, input data 208 can be generated from the captured input and input embedding data 210 can be generated from the input data 208, using one or more trained machine learning models and/or one or more other processes. An input embedding 226 can be generated from the input embedding data 210 and mapped to a latent space 222, as illustrated in view 220 of FIG. 2B. In some implementations, the latent space 222 can include mappings of permitted utility embeddings 224 and/or scalable utility embeddings 244. A distance in latent space between the input embedding 226 and the permitted utility embeddings 224, and/or another distance in latent space between the input embedding 226 and the scalable utility embeddings 244 can be determined. For example, when a distance in latent space between the input embedding 226 and one or more permitted utility embeddings 224 satisfy a scalable utility threshold 232, a scalable utility can be utilized by the automated assistant for resolving the spoken utterance 206 from the user 202. Alternatively, or additionally, when the input embedding 226 is at least a threshold distance from the permitted utility threshold 228, a scalable utility can be utilized by the automated assistant for resolving the spoken utterance 206 from the user 202.

In some implementations, a particular scalable utility that is selected can be associated with a particular value per use. This particular value can be compared to a value threshold associated with an account of the third party entity that is providing access to the automated assistant at the location 212. When the value threshold is satisfied by the particular value, the scalable utility can be utilized by the automated assistant to resolve the input from the user 202. For example, the scalable utility can be utilized to process the input data 208 in furtherance of generating responsive data that can characterize an output 242 for the automated assistant to render. The scalable utility can be used to generate and/or score (e.g., score relevance to the input) responsive data that can be rendered as output 242. When the responsive data is considered suitable (e.g., having a threshold relevance to the input) for rendering in response to the spoken utterance 206 from the user 202, the output 242 can be rendered as, for example, "A round trip from Louisville to Rome, Italy is about $1,500." This output can be generated using a trip planning utility, which can be available to the third party entity according to whether certain conditions are satisfied. The trip planning utility can utilize one or more different trained machine learning models than the permitted utilities for resolving health and food-related queries. In some implementations, a scalable utility can utilize a trained machine learning model that is trained using different training data than other training data that is used to train another trained machine learning model for a permitted utility. Alternatively, or additionally, a scalable utility can utilize a type of machine learning model (e.g., an ASR model) that is different from another type of model (e.g., an NLU model) utilized by a permitted utility.

Figure 3:
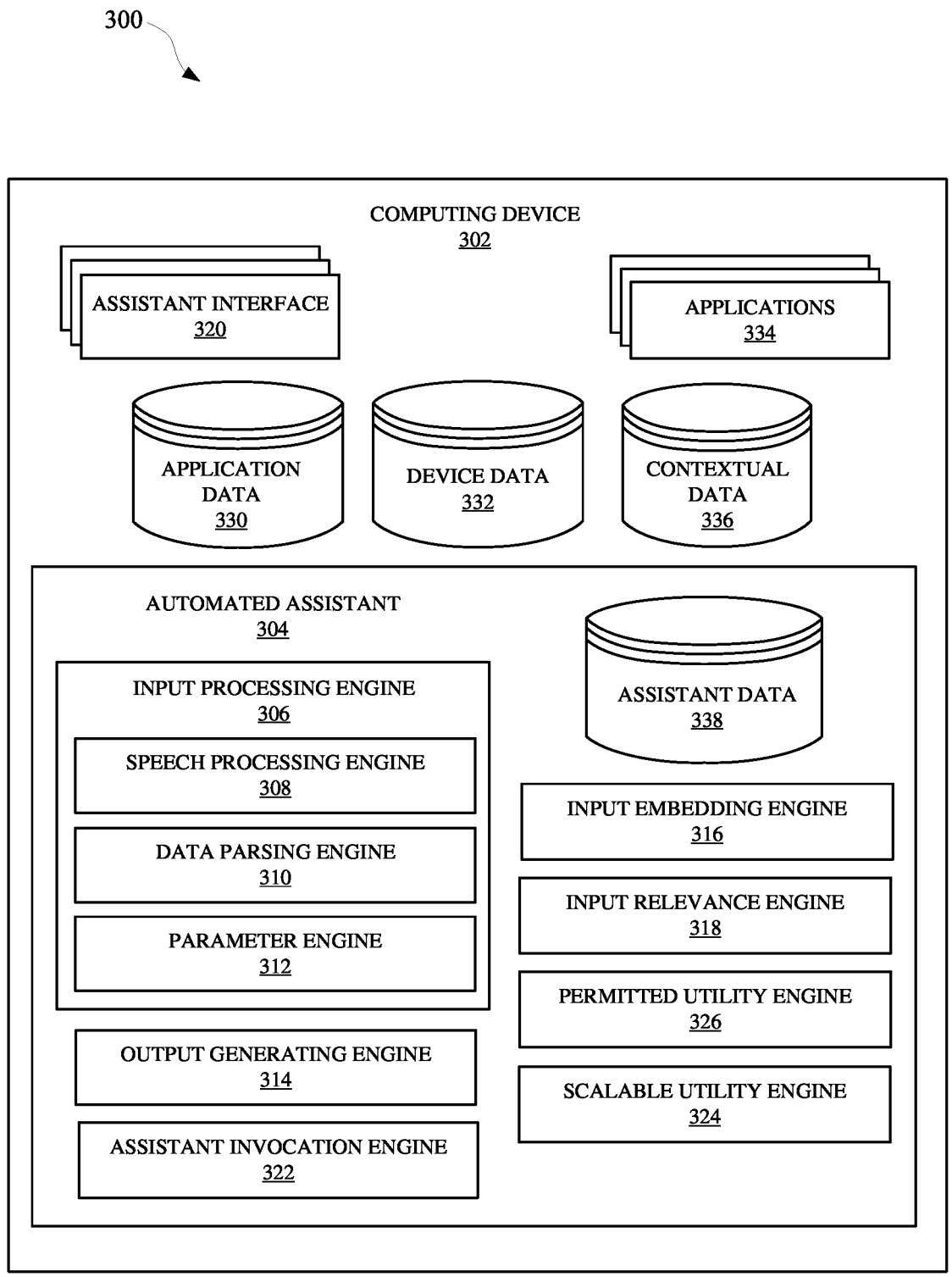
FIG. 3 illustrates a system for providing an automated assistant that can employ scalable utilities according to whether certain conditions have been satisfied.

FIG. 3 illustrates a system 300 for providing an automated assistant 304 that can employ scalable utilities according to whether certain conditions have been satisfied. The automated assistant 304 can operate as part of an assistant application that is provided at one or more computing devices, such as a computing device 302 and/or a server device. A user can interact with the automated assistant 304 via assistant interface(s) 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to initialize one or more actions (e.g., provide data, control a peripheral device, access an agent, generate an input and/or an output, etc.). Alternatively, the automated assistant 304 can be initialized based on processing of contextual data 346 using one or more trained machine learning models. The contextual data 346 can characterize one or more features of an environment in which the automated assistant 304 is accessible, and/or one or more features of a user that is predicted to be intending to interact with the automated assistant 304. The computing device 302 can include a display device, which can be a display panel that includes a touch interface for receiving touch inputs and/or gestures for allowing a user to control applications 344 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third party client devices can be in communication with a server device over a network, such as the Internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be exclusively processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 348 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 344 for providing an output to one or more applications 344.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 344 which can be provided by a third-party entity that is different from an entity that provided the computing device 302 and/or the automated assistant 304. An application state engine of the automated assistant 304 and/or the computing device 302 can access application data 340 to determine one or more actions capable of being performed by one or more applications 344, as well as a state of each application of the one or more applications 344 and/or a state of a respective device that is associated with the computing device 302. A device state engine of the automated assistant 304 and/or the computing device 302 can access device data 342 to determine one or more actions capable of being performed by the computing device 302 and/or one or more devices that are associated with the computing device 302. Furthermore, the application data 340 and/or any other data (e.g., device data 342) can be accessed by the automated assistant 304 to generate contextual data 346, which can characterize a context in which a particular application 344 and/or device is executing, and/or a context in which a particular user is accessing the computing device 302, accessing an application 344, and/or any other device or module.

While one or more applications 344 are executing at the computing device 302, the device data 342 can characterize a current operating state of each application 344 executing at the computing device 302. Furthermore, the application data 340 can characterize one or more features of an executing application 344, such as content of one or more graphical user interfaces being rendered at the direction of one or more applications 344. Alternatively, or additionally, the application data 340 can characterize an action schema, which can be updated by a respective application and/or by the automated assistant 304, based on a current operating status of the respective application. Alternatively, or additionally, one or more action schemas for one or more applications 344 can remain static, but can be accessed by the application state engine in order to determine a suitable action to initialize via the automated assistant 304.

The computing device 302 can further include an assistant invocation engine 322 that can use one or more trained machine learning models to process application data 340, device data 342, contextual data 346, and/or any other data that is accessible to the computing device 302. The assistant invocation engine 322 can process this data in order to determine whether or not to wait for a user to explicitly speak an invocation phrase to invoke the automated assistant 304, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 322 can cause the automated assistant 304 to detect, or limit detecting, spoken invocation phrases from a user based on features of a context and/or an environment. Additionally, or alternatively, the assistant invocation engine 322 can cause the automated assistant 304 to detect, or limit detecting for one or more assistant commands from a user based on features of a context and/or an environment. In some implementations, the assistant invocation engine 322 can be disabled or limited based on the computing device 302 detecting an assistant suppressing output from another computing device. In this way, when the computing device 302 is detecting an assistant suppressing output, the automated assistant 304 will not be invoked based on contextual data 346—which would otherwise cause the automated assistant 304 to be invoked if the assistant suppressing output was not being detected.

In some implementations, the system 300 can include an input embedding engine 316 that can operate with the input processing engine 306 to generate an embedding from an input received by the automated assistant 304. The input can be, for example, a spoken utterance provided by a user, and the input embedding engine 316 can process the input to generate an input embedding. In some implementations, the input embedding can be generated using one or more trained machine learning models and/or one or more heuristic processes for converting the input into data that can be mapped to a latent space.

In some implementations, the system 300 can include an input relevance engine 318 that can map the input embedding generated by the input embedding engine 316 to a latent space with other embeddings. The other embeddings can correspond to permitted utilities and scalable utilities of the automated assistant 304. A permitted utility and a scalable utility can be portions of data and/or modules that can be employed by the automated assistant 304 to resolve inputs. A permitted utility can be expressly authorized by an account of a third party entity that is providing access to the automated assistant 304. A scalable utility can be authorized by an account of the third party entity when one or more conditions are satisfied. When an input embedding is generated by the input embedding engine 316, the input relevance engine 318 can determine whether the input is semantically relevant to a threshold degree to a permitted utility. In some implementations, the degree of semantic relevance can be based on a distance in latent space between the input embedding and a permitted utility embedding. When this distance satisfies a threshold, the input can be determined to be relevant to the permitted utility embedding, and as a result, the corresponding permitted utility can be utilized to resolve the input. For example, a permitted utility engine 326 of the system 300 can be employed to select a suitable permitted utility (e.g., an ASR model) to assist with resolving the input. The permitted utility engine 326 can select the permitted utility based on the distance in latent space between the input embedding and/or one or more permitted utility embeddings. Alternatively, or additionally, the permitted utility engine 326 can select the permitted utility to employ based on a frequency of usage of a permitted utility, information associated with the user of the automated assistant, features of a third party entity that has made the automated assistant available, and/or any other information that can be utilize to select a utility for an application.

When the distance does not satisfy the threshold, the input relevance engine 318 can provide an indication to a scalable utility engine 324 for determining whether to utilize a scalable utility for resolving the input. In some implementations, the scalable utility engine 324 can determine whether one or more conditions are satisfied for employing a scalable utility for the third party entity. The one or more conditions can be based on one or more thresholds set by the third party entity, such as a value threshold and/or a semantic relevance threshold. The value threshold can correspond to an amount of value and/or resources that the third party entity would like to limit the automated assistant from consuming. For example, an entity that provides the automated assistant application can charge a particular value for employing certain utilities, and a third party entity can limit the charges to a certain threshold value for a certain duration of time. For example, the third party entity can limit the automated assistant from charging over a particular value threshold (e.g., 100 tokens) for a duration of time (e.g., per month). Alternatively, or additionally, the third party entity can limit queries that are not relevant to a particular degree from being responded to by the automated assistant. For example, the automated assistant may not attempt to resolve certain input queries that are determined to not be within a threshold degree of relevance to any permitted utilities and/or scalable utilities. Rather, in response to receiving an input that is determined to not be relevant to a threshold degree to a permitted utility, the automated assistant can cause an indication to be rendered with information for another application and/or other source of assistance for resolving the input.

In some implementations, the scalable utility engine 324 can determine a quantity of user queries that have been provided to an automated assistant associated with an account and/or a third party entity, but have not been resolved by the automated assistant. In certain instances, the user queries may not have been resolved because the third party entity elected to not set a threshold accordingly, and/or had not provided a budget that would allow for the resolution of all of the queries. In some implementations, the scalable utility engine can determine a separate quantity of user queries that could have been resolved by the automated assistant 304 if a particular setting and/or threshold for the automated assistant 304 were adjusted. In some implementations, this separate quantity can be a total number and/or percentage value that can be rendered at an interface that is accessible to an agent of the third party entity. In this way, the third party entity can receive feedback from their customized automated assistant 304 and make adjustments to threshold values to allow for other scalable utilities to be employed for resolving user queries that may be frequently provided by customers of the third party entity. Alternatively, or additionally, the third party entity can permit certain scalable utilities to be utilized by their particular automated assistant 304, thereby designating the "scalable" utilities as "permitted" utilities. Thereafter, the newly permitted utilities can be employed by the automated assistant 304 to resolve additional user inputs that may not have been previously resolved by the automated assistant 304.

Figure 4:
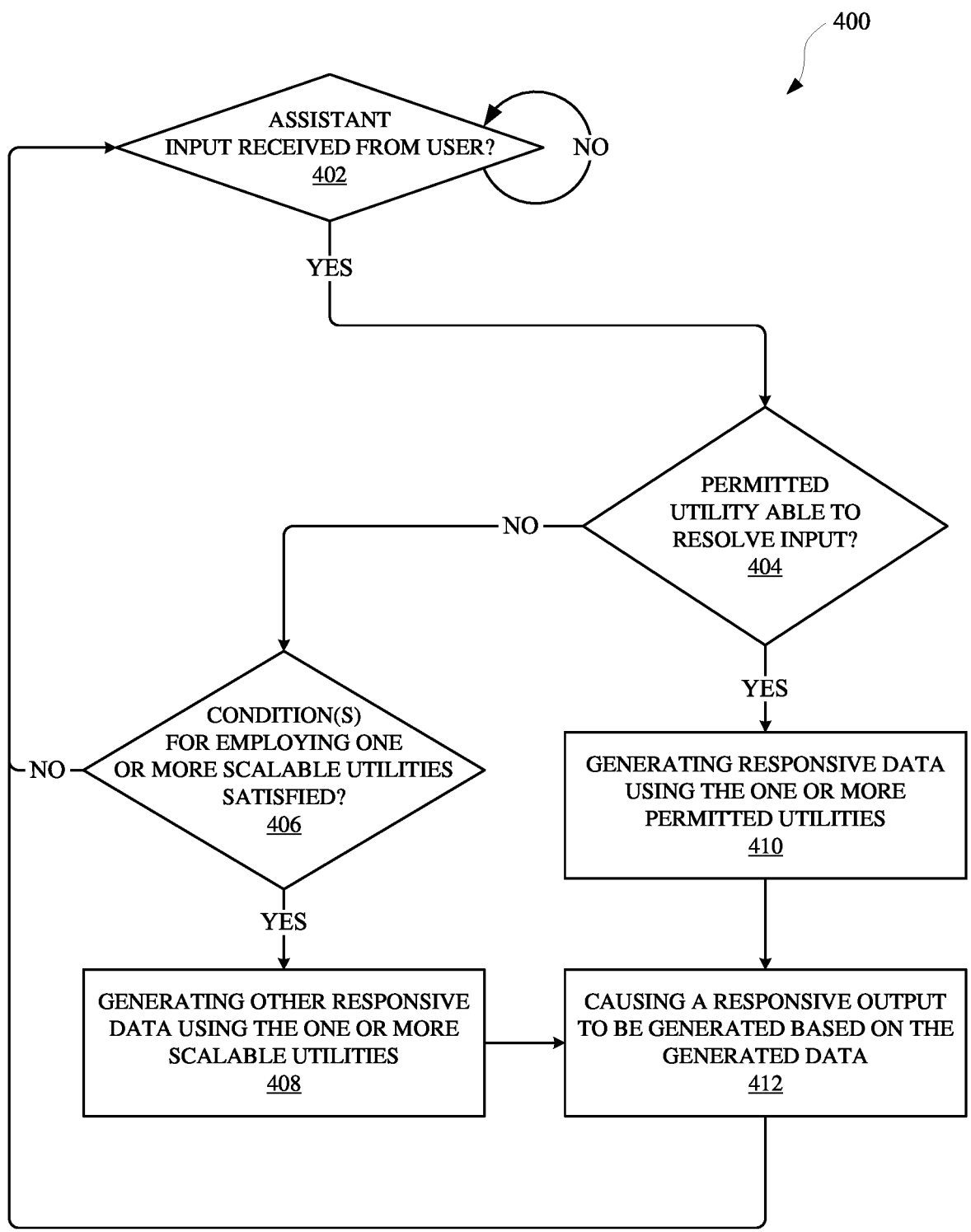
FIG. 4 illustrates a method for scaling utilities of an automated assistant according to whether user queries are semantically similar to permitted utilities and/or whether certain conditions have been satisfied for authorizing scaling of the utilities.

FIG. 4 illustrates a method 400 for scaling utilities of an automated assistant according to whether user queries are semantically similar to permitted utilities and/or whether certain conditions have been satisfied for authorizing scaling of the utilities. The method 400 can be performed by one or more computing devices, applications, and/or any other apparatus or module that can be associated with an automated assistant. The method 400 can include an operation 402 of determining whether an assistant input has been received, by an automated assistant, from a user of the automated assistant. The automated assistant can optionally be an application that is customized by a third party entity (e.g., third party relative to a provider of the automated assistant) to provide certain services to users that interact with the third party entity. For example, the third party entity can be an entity that provides a service and/or apparatus, and the third party entity can elect to incorporate the automated assistant (e.g., via an application programming interface (API), plug-in, etc.) into their service and/or apparatus. In some implementations, the service can be a third party application, and the automated assistant can be incorporated into the third party application, thereby allowing users of the third party application to interact with a customized automated assistant of the third party application.

When one or more assistant inputs are received from one or more users of the automated assistant, third party application, and/or third party device, the method 400 can proceed from the operation 402 to an operation 404. Otherwise, the method 400 can continue to determine whether assistant inputs have been received at the operation 402. The operation 404 can include determining whether one or more permitted utilities are able to resolve the input from the user. The input data can characterize the one or more assistant inputs from the one or more users, and the one or more permitted utilities can include utilities that a third party entity has expressly elected to incorporate into their customized automated assistant. For example, the permitted utilities can refer to one or more ASR models, one or more NLU models, one or more other trained machine learning models, one or more heuristic processes, and/or any other features that can be utilized by an automated assistant for processing inputs. When the third party entity is, for example, a computer store, the utilities expressly permitted by the computer store can include language models for responding to questions about computer hardware and/or for handling requests to order computer parts. Therefore, when a user (e.g., a customer of the computer store) provides a user input that queries the automated assistant regarding a particular computer part, this user input may be resolved by the permitted utilities, where as a separate user input regarding questions about Newtonian physics may not be resolved by the permitted utilities.

In some implementations, determining a degree of semantic similarity of a user input to a particular assistant utility is performed to determine whether a permitted utility can resolve a user input. Determining the degree of semantic similarity can involve one or more trained machine learning models and/or one or more heuristic processes. For example, one or more trained machine learning models can be utilized to process input data and generate embedding data from the input data. The embedding data can characterize one or more input embeddings that can be mapped to a latent space with utility embeddings. The utility embeddings can represent embeddings, and each respective embedding can correspond to a utility that a particular account and/or entity has authorized, and/or otherwise has access to through scaling. A distance in latent space between an input embedding and a utility embedding can indicate a relevance of a corresponding user input (e.g., a customer asking a question about a computer) to a particular utility (e.g., a utility that the automated assistant employs to resolve computer-related questions).

When a permitted utility is determined to be unable to resolve the input, the method 400 can proceed from the operation 404 to an operation 406. Otherwise, the method 400 can proceed from the operation 404 to an operation 410. The operation 406 can include determining whether one or more conditions for employing one or more scalable utilities are satisfied. In some implementations, a condition for employing a scalable utility can be based on a value or other limit set by the third party entity for incurring charges that may be associated with employing a scalable utility. Alternatively, or additionally, a condition for employing a scalable utility can be based on a degree of relevance of a particular user input to a permitted utility and/or a scalable utility. In other words, a third party entity may not want to employ a scalable utility if the input is not at least relevant to a threshold degree to a permitted utility. Alternatively, or additionally, the third party entity may not want to employ a scalable utility if the input is not at least relevant to a threshold degree to a scalable utility (e.g., a utility that the third party entity may not have expressly permitted at the time of receiving the user input). In some implementations, determining whether a condition is satisfied can include determining whether the input data satisfies a threshold degree of relevance to a permitted utility. For example, a distance in the latent space from the input embedding to permitted utility embeddings can be determined. When the distance from the input embedding to a permitted utility embedding satisfies a distance threshold, the method 400 can proceed from the operation 406 to an operation 408. Otherwise, the method 400 can proceed from the operation 408 and return to the operation 402, or optionally perform an operation of notifying the user or a third party entity of the lack of a relevant utility. Alternatively, or additionally, the method 400 can optionally include an operation of providing the user and/or the third party entity with information regarding a source of information that can assist with responding to one or more queries embodied in the input data. For example, a suggestion output can be rendered with an identifier for a separate application and/or a separate source of information for soliciting a response to the user input.

In some implementations, the operation 410 can include generating responsive data using the one or more permitted utilities, and the operation 408 can include generating other responsive data using one or more scalable utilities. A utility that is employed for the operation 410 and/or the operation 408 can include a trained machine learning model, a heuristic process, and/or any other feature of an application that can assist with processing data. For example, a permitted utility can include a trained machine learning model that is trained using data associated with computer science information, such as technical specifications. As another example, a scalable utility can include a different trained machine learning model that is trained using other data associated with physics information, such as educational materials for learning physics. Responsive data generated using a particular utility can embody a response that an automated assistant can provide in response to a user input from a user. For example, a user input such as, "Assistant, is there a wireless mouse in stock?" can be processed using a permitted utility for processing computer-related order requests. Alternatively, another user input such as, "Assistant, who invented the infrared sensor?" can be processed using a scalable utility for processing historical-related computer questions.

The method 400 can proceed from the operation 410, or the operation 408, to an operation 412 of causing a responsive output to be generated based on the generated responsive data. For example, when the user input regarding the "wireless mouse" is received, the automated assistant can provide a responsive output such as, "Yes, there are multiple styles available in aisle 9." Alternatively, when the other user input regarding the "infrared sensor" is received, the automated assistant can provide a different responsive output, attributed to a different utility and/or assistant, such as, "Herbert Berman may have been the first to invent a type of infrared sensor." However, in some instances, when the one or more conditions are not satisfied, this other user input may not be resolved and, instead, data may be provided to the third party entity indicating that the other user input could have been processed if certain conditions were modified. For example, an amount by which a threshold or limit for a particular condition should be changed can be determined, in order to allow such user inputs to be responded to by the automated assistant.

The third party entity can then make a determination regarding whether to adjust the threshold or limit (e.g., adjust their budget limit, adjust their semantic similarity threshold, etc.) to permit similar user inputs to be processed using one or more scalable utilities. In some implementations, the third party entity can be presented with this data at a visual interface of a computing device, thereby allowing the third party entity to visualize how changes to certain thresholds and/or limits might allow their automated assistant to handle queries that the users (e.g., customers of the third party entity) may be frequently interested in. For example, the automated assistant can cause an interface of a computing device to render an updated value (e.g., 5 points lower than a current value) for a semantic similarity threshold with an indication of a percentage increase (e.g., "15% increase") in user inputs that would be resolved as a result of the third party entity adjusting the semantic similarity threshold to be the updated value. Alternatively, or additionally, any unresolved queries could be processed to identify summary queries, which can be presented at the interface with threshold values that can be adjusted to show the third party entity the types of queries that can be resolved if certain threshold values are adjusted. For example, some users may have provided queries asking for directions to different locations, and the interface can render a summary of these queries such as, "Navigation-Related Queries." The summary can be rendered with a threshold value that, when adjusted to another limit for the "Navigation-Related Queries," the automated assistant would be permitted to use a utility for resolving subsequent Navigation-Related Queries.

Figure 5:
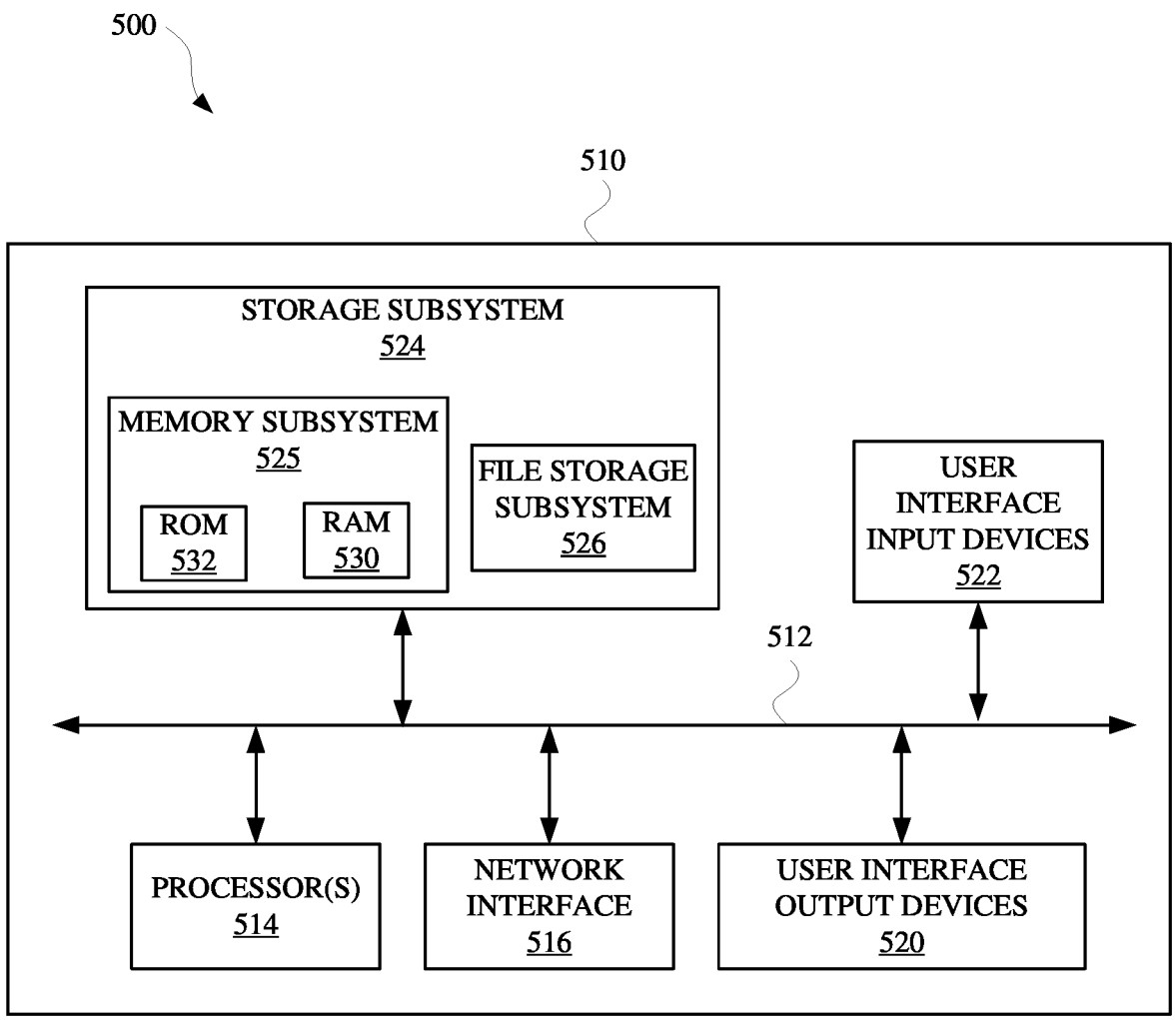
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 300, and/or to implement one or more of system 400, computing device 104, automated assistant, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 540 for storage of instructions and data during program execution and a read only memory (ROM) 542 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including one or more operations such as receiving input data indicating that a user input has been provided to a computing device that provides access to an automated assistant. The computing device is associated with an account authorized to employ one or more permitted utilities for generating responsive data based on user inputs, and the automated assistant operates to employ one or more scalable utilities when one or more conditions for employing the one or more scalable utilities are satisfied. The operations can further include determining, based on the input data and using one or more trained machine learning models, a semantic relevance of the input data to the one or more permitted utilities for generating the responsive data. The method can further include determining, based on the semantic relevance, that the input data is not semantically related to a threshold degree to the one or more permitted utilities for generating the responsive data. The method can further include determining, based on the input data not being semantically related to the threshold degree to the one or more permitted utilities, whether the one or more conditions for employing the one or more scalable utilities are satisfied. The method can further include, when the one or more conditions are determined to be satisfied for employing the one or more scalable utilities: causing a particular utility of the one or more scalable utilities to be utilized for generating, based on the user input, other responsive data for responding to the user input; and causing a responsive output to be rendered by the computing device or a separate computing device using the other responsive data.

In some implementations, the method can include, when the one or more conditions for employing the one or more scalable utilities are not satisfied, causing a suggestion output to be rendered by the computing device or the separate computing device. The suggestion output identifies a separate application for soliciting a response to the user input. In some implementations, the one or more permitted utilities employ a particular data storage model, and the one or more scalable utilities employ a different data storage model. In some implementations, the one or more permitted utilities employ a particular natural language understanding model, and the one or more scalable utilities employ a different natural language model. In some implementations, the one or more conditions for employing the one or more scalable utilities are characterized by condition data that is provided by an entity that provides access to the one or more permitted utilities.

In some implementations, the semantic relevance of the input data to the one or more permitted utilities is based on a distance in latent space between an input embedding and a permitted utility embedding, and the input embedding is generated using the one or more trained machine learning models and the input data. In some implementations, the input data is not semantically related to the threshold degree, to the one or more permitted utilities for generating the responsive data, when the distance in the latent space does not satisfy a relevance threshold for the one or more permitted utilities. In some implementations, determining whether the one or more conditions for employing the one or more scalable utilities is based on the distance in the latent space between the input embedding and the permitted utility embedding. In some implementations, the method can include, when the one or more conditions are determined to be satisfied for employing the one or more scalable utilities: causing the responsive output to be rendered with an indication that the one or more scalable utilities were utilized to generate the responsive output. In some implementations, determining whether the one or more conditions for employing the one or more scalable utilities are satisfied includes: determining whether a value threshold stored in association with the account is satisfied by a value metric that is associated with the one or more scalable utilities, where the one or more conditions are satisfied when the value metric satisfies the value threshold.

In other implementations, a method implemented by one or more processors is set forth as including one or more operations such as processing assistant data that is generated based on user queries being received by an automated assistant that is accessible via one or more computing devices that are associated with an account. The automated assistant responds to the user queries according to whether one or more permitted utilities are authorized by the account. The method can further include determining, based on processing the assistant data, a quantity of user queries, provided to the one or more computing devices associated with the account, that have been received by the automated assistant but have not been resolved by the automated assistant using the one or more permitted utilities authorized by the account. The method can further include determining, based on the quantity of user queries, a separate quantity of the user queries that the automated assistant can resolve using one or more scalable utilities that are not currently authorized by the account. The method can further include causing, based on the separate quantity of the user queries, content to be rendered at an interface of a particular computing device associated with the account. The content indicates the separate quantity of user queries that can be resolved by the automated assistant when the account authorizes the one or more scalable utilities.

In some implementations, the method can include determining a degree to which a scalable utility threshold can be adjusted that would allow the automated assistant to resolve the user queries using the one or more scalable utilities. In some implementations, determining a degree to which a value threshold can be adjusted that would allow the automated assistant to resolve the user queries using the one or more scalable utilities.

In yet other implementations, a method implemented by one or more processors is set forth as including one or more operations such as receiving input data indicating that a user input has been provided to a computing device that provides access to an automated assistant. The computing device is associated with an account authorized to employ one or more permitted utilities for generating responsive data based on user inputs, and the automated assistant operates to employ one or more scalable utilities when one or more conditions for employing the one or more scalable utilities are satisfied. The method can further include determining, based on the input data and using one or more trained machine learning models, a semantic relevance of the input data to the one or more permitted utilities for generating the responsive data. The method can further include determining, based on the semantic relevance, whether the input data is semantically related to a threshold degree to the one or more permitted utilities for generating the responsive data. The method can further include, when the input data is determined to not be semantically related to a threshold degree to the one or more permitted utilities for generating the responsive data: determining, based on the input data not being semantically related to the threshold degree to the one or more permitted utilities, whether the one or more conditions for employing the one or more scalable utilities are satisfied; and causing a particular utility of the one or more scalable utilities to be utilized for generating a responsive output when the one or more conditions for employing the one or more scalable utilities are satisfied.

In some implementations, the method includes causing a suggestion output to be rendered by the computing device or the separate computing device when the one or more conditions for employing the one or more scalable utilities are not satisfied. The suggestion output identifies a separate application for soliciting a response to the user input. In some implementations, the one or more permitted utilities employ a particular natural language understanding model, and the one or more scalable utilities employ a different natural language understanding model. In some implementations, the one or more conditions for employing the one or more scalable utilities are characterized by condition data that is provided by an entity that provides access to the one or more permitted utilities.

In some implementations, the semantic relevance of the input data to the one or more permitted utilities is based on a distance in latent space between an input embedding and a permitted utility embedding, and the input embedding is generated using the one or more trained machine learning models and the input data. In some implementations, the input data is not semantically related to the threshold degree, to the one or more permitted utilities for generating the responsive data, when the distance in the latent space does not satisfy a permitted utility threshold for the one or more permitted utilities. In some implementations, determining whether the one or more conditions for employing the one or more scalable utilities is based on the distance in the latent space between the input embedding and the permitted utility embedding. In some implementations, the method can further include causing the responsive output to be rendered with an indication that the one or more scalable utilities were utilized to generate the responsive output when the one or more conditions are determined to be satisfied for employing the one or more scalable utilities.

We claim:

1. A method implemented by one or more processors, the method comprising:
    receiving input data indicating that a user input has been provided to a computing device that provides access to an automated assistant,
        wherein the computing device is associated with an account authorized to employ one or more permitted utilities for generating responsive data based on user inputs, and
        wherein the automated assistant operates to employ one or more scalable utilities when one or more conditions for employing the one or more scalable utilities are satisfied;
    determining, based on the input data and using one or more trained machine learning models, a semantic relevance of the input data to the one or more permitted utilities for generating the responsive data;
    determining, based on the semantic relevance, that the input data is not semantically related to a threshold degree to the one or more permitted utilities for generating the responsive data;
    determining, in response to the input data not being semantically related to the threshold degree to the one or more permitted utilities, whether the one or more conditions for employing the one or more scalable utilities are satisfied; and
    when the one or more conditions are determined to be satisfied for employing the one or more scalable utilities:
        causing a particular utility of the one or more scalable utilities to be utilized for generating, based on the user input, other responsive data for responding to the user input; and
        causing a responsive output to be rendered by the computing device or a separate computing device using the other responsive data.

2. The method of claim 1, wherein the one or more permitted utilities employ a particular natural language understanding model, and the one or more scalable utilities employ a different natural language understanding model.

3. The method of claim 1, wherein the one or more conditions for employing the one or more scalable utilities are characterized by condition data that is provided by an entity that provides access to the one or more permitted utilities.

4. The method of claim 1,
wherein the semantic relevance of the input data to the one or more permitted utilities is based on a distance in latent space between an input embedding and a permitted utility embedding, and
wherein the input embedding is generated using the one or more trained machine learning models and the input data.

5. The method of claim 4, wherein the input data is not semantically related to the threshold degree, to the one or more permitted utilities for generating the responsive data, when the distance in the latent space does not satisfy a relevance threshold for the one or more permitted utilities.

6. The method of claim 5, wherein determining whether the one or more conditions for employing the one or more scalable utilities is based on the distance in the latent space between the input embedding and the permitted utility embedding.

7. The method of claim 1, further comprising:
when the one or more conditions are determined to be satisfied for employing the one or more scalable utilities:
causing the responsive output to be rendered with an indication that the one or more scalable utilities were utilized to generate the responsive output.

8. The method of claim 1, wherein determining whether the one or more conditions for employing the one or more scalable utilities are satisfied includes:
determining whether a value threshold stored in association with the account is satisfied by a value metric that is associated with the one or more scalable utilities,
wherein the one or more conditions are satisfied when the value metric satisfies the value threshold.

9. A method implemented by one or more processors, the method comprising:
processing assistant data that is generated based on user queries being received by an automated assistant that is accessible via one or more computing devices that are associated with an account,
wherein the automated assistant responds to the user queries according to whether one or more permitted utilities are authorized by the account;
determining, based on processing the assistant data, a quantity of user queries, provided to the one or more computing devices associated with the account, that have been received by the automated assistant but have not been resolved by the automated assistant using the one or more permitted utilities authorized by the account;
determining, based on the quantity of user queries, a separate quantity of the user queries that the automated assistant can resolve using one or more scalable utilities that are not currently authorized by the account; and
causing, based on the separate quantity of the user queries, content to be rendered at an interface of a particular computing device associated with the account,
wherein the content indicates the separate quantity of user queries that can be resolved by the automated assistant when the account authorizes the one or more scalable utilities.

10. The method of claim 9, further comprising:
determining a degree to which a scalable utility threshold can be adjusted that would allow the automated assistant to resolve the user queries using the one or more scalable utilities.

11. The method of claim 9,
determining a degree to which a value threshold can be adjusted that would allow the automated assistant to resolve the user queries using the one or more scalable utilities.

12. A method implemented by one or more processors, the method comprising:
receiving input data indicating that a user input has been provided to a computing device that provides access to an automated assistant,
wherein the computing device is associated with an account authorized to employ one or more permitted utilities for generating responsive data based on user inputs, and
wherein the automated assistant operates to employ one or more scalable utilities when one or more conditions for employing the one or more scalable utilities are satisfied;
determining, based on the input data and using one or more trained machine learning models, a semantic relevance of the input data to the one or more permitted utilities for generating the responsive data;
determining, based on the semantic relevance, whether the input data is semantically related to a threshold degree to the one or more permitted utilities for generating the responsive data; and
when the input data is determined to not be semantically related to the threshold degree to the one or more permitted utilities for generating the responsive data:
determining, in response to the input data not being semantically related to the threshold degree to the one or more permitted utilities, whether the one or more conditions for employing the one or more scalable utilities are satisfied; and
causing a particular utility of the one or more scalable utilities to be utilized for generating a responsive output when the one or more conditions for employing the one or more scalable utilities are satisfied.

13. The method of claim 12, further comprising:
causing a suggestion output to be rendered by the computing device or a separate computing device when the one or more conditions for employing the one or more scalable utilities are not satisfied,
wherein the suggestion output identifies a separate application for soliciting a response to the user input.

14. The method of claim 12, wherein the one or more permitted utilities employ a particular natural language understanding model, and the one or more scalable utilities employ a different natural language understanding model.

15. The method of claim 12, wherein the one or more conditions for employing the one or more scalable utilities are characterized by condition data that is provided by an entity that provides access to the one or more permitted utilities.

16. The method of claim 12,
wherein the semantic relevance of the input data to the one or more permitted utilities is based on a distance in latent space between an input embedding and a permitted utility embedding, and
wherein the input embedding is generated using the one or more trained machine learning models and the input data.

17. The method of claim 16, wherein the input data is not semantically related to the threshold degree, to the one or more permitted utilities for generating the responsive data, when the distance in the latent space does not satisfy a permitted utility threshold for the one or more permitted utilities.

18. The method of claim 17, wherein determining whether the one or more conditions for employing the one or more scalable utilities is based on the distance in the latent space between the input embedding and the permitted utility embedding.

19. The method of claim 12, further comprising:
   causing the responsive output to be rendered with an indication that the one or more scalable utilities were utilized to generate the responsive output when the one or more conditions are determined to be satisfied for employing the one or more scalable utilities.

\* \* \* \* \*